United States Patent
Jideani et al.

(10) Patent No.: US 11,910,813 B2
(45) Date of Patent: Feb. 27, 2024

(54) STARCH-SOLUBLE DIETARY FIBRE NANOCOMPOSITE

(71) Applicant: Cape Peninsula University of Technology, Cape Town (ZA)

(72) Inventors: Victoria Adaora Ebele Jideani, Cape Town (ZA); Yvonne Maphosa, Cape Town (ZA); Nontobeko Benhilda Gulu, Cape Town (ZA); Daniel Imwansi Ogiemwanva Ikhu-Omoregbe, Cape Town (ZA)

(73) Assignee: Cape Peninsula University of Technology, Cape Town (ZA)

( * ) Notice: Subject to any disclaimer, the term of this patent is extended or adjusted under 35 U.S.C. 154(b) by 83 days.

(21) Appl. No.: 17/500,062

(22) Filed: Oct. 13, 2021

(65) Prior Publication Data

US 2022/0110356 A1   Apr. 14, 2022

(30) Foreign Application Priority Data

Oct. 14, 2020  (GB) ..................... 2016304

(51) Int. Cl.
  *A23L 33/21*    (2016.01)
  *A23L 29/212*   (2016.01)
(52) U.S. Cl.
  CPC ............. *A23L 33/21* (2016.08); *A23L 29/212* (2016.08); *A23V 2002/00* (2013.01)
(58) Field of Classification Search
  None
  See application file for complete search history.

(56) References Cited

PUBLICATIONS

Adeyi, O., Ikhu-Omoregbe, D., & Jideani, V. (2014). Emulsion stability and steady shear characteristics of concentrated oil-in-water emulsion stabilized by gelatinized Bambara groundnut flour. Asian Journal of Chemistry, 26, 4995-5002. https://doi.org/10.14233/ajchem.2014.16287.

Afolabi, T.A. (2012). Synthesis and physicochemical properties of carboxymethylated bambara groundnut (*Voandzeia subterranea*) starch. International Journal of Food Science and Technology, 47, 445-451. https://doi.org/10.1111/j.1365-2621.2011.02860.x.

Kasran, M. (2013). Development of Protein Polysaccharide Complex for Stabilization of Oil-in-Water Emulsions. PhD Thesis, The University of Guelph. http://hdl.handle.net/10214/5445.

Maphosa, Y., & Jideani, V.A. (2016). Physicochemical characteristics of Bambara groundnut dietary fibres extracted using wet milling. South African Journal of Science, 112, 1-8. http://dx.doi.org/10.17159/sajs.2016/20150126.

Singh, S., D'Sa, E., & Swenson, E. (2010). Seasonal variability in CDOM absorption and fluorescence properties in the Barataria Basin, Louisiana, USA. Journal of Environmental Sciences, 22, 1481-1490. https://doi.org/10.1016/s1001-0742(09)60279-5.

*Primary Examiner* — Jyoti Chawla
(74) *Attorney, Agent, or Firm* — BakerHostetler

(57) ABSTRACT

This invention provides for a nanocomposite comprising a *Vigna subterranea* starch component and a *Vigna subterranea* soluble dietary fibre (SDF) component. *Vigna subterranea* is otherwise none as Bambara groundnut (BGN). In particular, this invention relates to a graft copolymer nanocomposite comprising starch derived from BGN and soluble dietary fibre derived from BGN. The nanocomposite of the invention is useful in several food applications, including as a replacement of other starches and the stabilisation of emulsions.

9 Claims, 7 Drawing Sheets

STARCH-SOLUBLE DIETARY FIBRE NANOCOMPOSITE

CROSS-REFERENCE TO RELATED APPLICATIONS

This application claims priority to United Kingdom Patent Application No. 2016304.4, filed Oct. 14, 2020, which is hereby incorporated by reference.

FIELD OF THE INVENTION

This invention relates to a nanocomposite made from *Vigna subterranea* (commonly known as Bambara groundnut (BGN)) starch and BGN soluble dietary fibre (SDF). In particular, this invention relates to a graft copolymer nanocomposite comprising starch derived from BGN and soluble dietary fibre derived from BGN.

BACKGROUND OF THE INVENTION

Several researchers have studied the application of composites and nanocomposites in food packaging materials. However, there is very limited information on their synthesis and incorporation in food products. Polymer-polysaccharide and polysaccharide-polysaccharide composites are preferred in the food industry because of their non-toxicity, stability, nutritional benefits, biocompatibility, biodegradability and relatively low cost. Although polymer-polysaccharide complexes have been studied by various researchers, they remain one of the most challenging topics to understand.

Several methods can be employed in the formation of nanocomposites. These include complex coacervation, desolvation, reactive extrusion, crosslinking, free radical-induced grafting, acid hydrolysis and self-assembling. The choice of method depends on many factors such as required particle size, source of polymer, thermal stability, physicochemical stability of active agent, the stability of the final product, residual toxicity associated with the final product and desired end use of composite.

A source of polysaccharides in the form of starch and soluble dietary fibre is Bambara groundnut. Bambara groundnut (BGN) is a crop commonly grown in sub-Saharan Africa and other parts of the world. This legume is characterised by high dietary fibre in the range 17.7-24.3%. Bambara groundnut soluble dietary fibres (BGN-SDF) have high oil binding capacities (OBC) (2.78-4.03 g oil/g sample) which suggests that they can be effectively used as stabilisers in high-fat food products and emulsions as well as bind and/or replace fat in meat products. BGN-SDF is rich in bioactive compounds, namely, uronic acids (11.8%) and hydrolysable polyphenols [6.89-20.86 mg/g Gallic acid equivalent], with crucial physiological and functional benefits, including antioxidant properties. BGN-SDFs are light in colour with a lightness (L*) ranging from 70.96 to 74.04. Their light colour allows them to be used in various food systems without noticeably affecting the colour.

Bambara groundnut is also characterised by a high starch composition (22-50%). The starch content of BGN is relatively high in comparison to the food industry's common starch sources such as potatoes (15-23%) and maize (24-25%). There is an increasing need for alternative sources of starch in the food industry to reduce the over use of cereal starch especially considering the decline in cereal production due to climate changes. As such, BGN starch (BGNS) has the potential to be a suitable alternative to cereal starch.

However, native starch is not robust in processing because of the inherent undesirable attributes that render it unstable. These attributes include the tendency of starch to easily gelatinise, retrograde and undergo syneresis as well as instability to various temperatures, shear and pH. All these characteristics limit the use of native starch in food systems but can be mitigated by modification. One way of mitigating the undesirable properties of starch involves modification by complexing with a more robust biopolymer. SDF is a good emulsion stabiliser, however, a large amount (30%) is typically needed to achieve desirable emulsion stability. Such a high amount would be too costly for use in products.

A need, therefore, exists to develop a starch composite useful as an additive in the food industry that will mitigate the limitations of starch and allow the use of lower amounts of SDF.

As such, it is an object of this invention to complex a polysaccharide containing starch and a polysaccharide containing SDF, derived from BGN, to form a graft copolymer nanocomposite that will not only provide a novel additive in any food system but will mitigate the limitations of starch and allow the use of lower amounts of SDF.

SUMMARY OF THE INVENTION

In accordance with a first aspect of the invention there is provided a graft copolymer nanocomposite comprising:
 a polysaccharide containing starch component derived from *Vigna Subterranea*; and
 a polysaccharide containing soluble dietary fibre component derived from *Vigna Subterranea*,
wherein the nanocomposite comprises one or more copolymers of the soluble dietary fibre polysaccharide component grafted onto a matrix of the starch polysaccharide component.

Preferably, the nanocomposite has an FTIR spectrum as shown in FIG. 2.

Preferably, the nanocomposite has peaks on an FTIR spectrum at about 3279.87, 1631.18, 1077.11, and 419.64 cm$^{-1}$.

More preferably, the nanocomposite has peaks on an FTIR spectrum at about 3279.87, 2923.77, 1631.18, 1531.55, 1368.24, 1149.26, 1077.11, 996.68, and 419.64 cm$^{-1}$.

In one embodiment, the mass concentration ratio in the nanocomposite of polysaccharide containing starch component to polysaccharide containing soluble dietary fibre component is about 10 to about 15 g/100 mL of polysaccharide containing starch component and about 1.3 to about 1.95 g/100 mL of polysaccharide containing soluble dietary fibre component.

In one embodiment, the mass ratio in the nanocomposite of polysaccharide containing starch component to polysaccharide containing soluble dietary fibre component is about 15:1.95 (g/100 mL).

In another embodiment, the nanocomposite has an average particle size of about 74.01 nm.

In a further embodiment, the soluble dietary fibre polysaccharide component is grafted onto the matrix chemically, using ascorbic acid and hydrogen peroxide as a redox initiator pair.

In a preferred embodiment, the redox initiator pair has a weight ratio of 1% w/w ascorbic acid to 165% w/w hydrogen peroxide.

In accordance with a second aspect of the invention there is provided a method of modifying a polysaccharide containing starch component derived from *Vigna subterranea* by means of graft polymerisation, the method including:
grafting onto a matrix comprising the polysaccharide containing starch component a filler comprising a polysaccharide containing soluble dietary fibre component derived from *Vigna subterranea* in the presence of a redox initiator pair.

Preferably, the redox initiator pair comprises hydrogen peroxide and ascorbic acid.

More preferably, the mass ratio of ascorbic acid to hydrogen peroxide is 1:165.

In one embodiment, the mass ratio of the matrix to the filler is about 15:1.95

BRIEF DESCRIPTION OF THE FIGURES

Non-limiting embodiments of the invention will now be described by way of example only and with reference to the following figures in which.

DETAILED DESCRIPTION OF THE INVENTION

Figure 1:
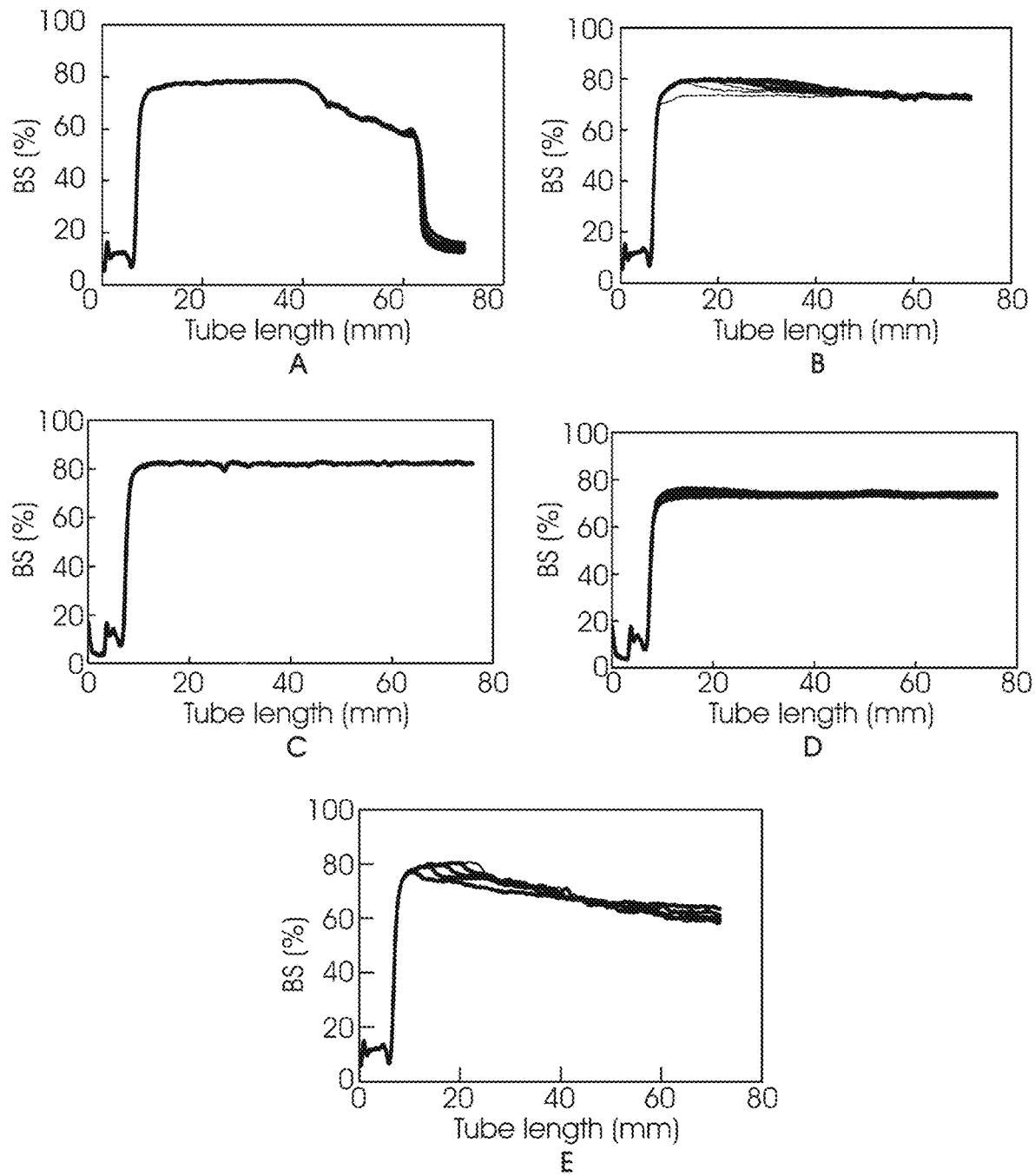
FIG. 1 shows changes in the backscattering (BS) profile (%) as a function of sample height with varying BGNS:BGN-SDF ratios (A) 5:0.65 (B) 10:1.3 (C) 15:1.95 (D) 15:0.65 (E) 5:1.95.

The present invention will now be described more fully hereinafter with reference to the accompanying drawings, in which some, but not all embodiments of the invention are shown.

The invention as described should not be limited to the specific embodiments disclosed and modifications and other embodiments are intended to be included within the scope of the invention. Although specific terms are employed herein, they are used in a generic and descriptive sense only and not for purposes of limitation.

As used throughout this specification and in the claims which follow, the singular forms "a", "an" and "the" include the plural form, unless the context clearly indicates otherwise.

The terminology and phraseology used herein is for the purpose of description and should not be regarded as limiting. The use of the terms "comprising", "containing", "having" and "including" and variations thereof used herein, are meant to encompass the items listed thereafter and equivalents thereof as well as additional items.

As used herein, the term "Bambara groundnut", "BGN" and "*Vigna subterranea*" are used interchangeably.

Composites are new functionalised molecules that possess characteristics of the grafted molecules and the natural polymer. Composites consist of two types of components, a filler and a matrix. Nanocomposites are polymeric composites filled with nano-sized particles. For composites to be considered nanocomposites, at least one dimension should be in the nano-level (<100 nm).

A graft copolymer is a composite polymer formed by the free radical-induced grafting method in which initiators, such as a redox initiator pair, generate free radicals that react with monomers to form copolymers. As used herein, graft polymerisation refers to such a method of forming a graft copolymer.

EXAMPLES

The following examples are offered by way of illustration and not by way of limitation.

Commercially-available BGN seeds were used in the examples that follow. The seeds were manually sorted and only the black-eye variety was used. Analytical grade chemicals were used in the examples that follow.

All experiments were carried out in triplicate. Data were expressed as mean. For statistical analysis, IBM Statistical Package for the Social Science was used. The results were subjected to multivariate analysis of variance (MANOVA) to establish differences between treatments. Duncan's multiple range test was used to separate means where a significant difference existed.

Extraction of BGN Soluble Dietary Fibre and Starch

Whole seeds were washed, dried at 50° C. for 48 hours in a cabinet drier and milled using a hammer mill with a sieve size of 250 μm. Flour (200 g) and distilled water (500 mL) were blended for 3 min and the slurry was centrifuged (15 min, 25° C., 1500×g). The supernatant and residue were used for the isolation of BGN-SDF and BGNS, respectively.

From the supernatant, proteins were precipitated by adjusting the pH of the soluble fraction from pH 3 to pH 9 using 1 N NaOH and 1 N HCl. Following precipitation, the soluble fraction was centrifuged (10 min, 25° C., 1500×g). The supernatant was filtered against four diafiltration volumes of Millipore water and subjected to a tangential flow filtration system and the recovered BGN-SDF fraction was freeze-dried. The residue was wet screened in 2 L of water through a 53 μm sieve and the washings that passed through the sieve were centrifuged (10 min, 25° C., 1500×g). The resultant pellet was air-dried as starch.

Example 1—Phase Behaviour of BGNS and BGN-SDF

The phase behaviour of different ratios of BGNS:BGN-SDF were determined as discussed below. The mass concentrations (g/g in 100 mL) [5:1.95, 15:0.65, 15:1.95, 10:1.3, 5:0.65] were determined using an augmented $2^2$ factorial design. Samples were weighed into centrifuge tubes, then mixed with 0.1 M NaCl and 10 mM tris-HCl buffer at pH 7.2 (total volume 100 mL). The mixture was vortexed at high speed for 1 min and then left to stand overnight at 20° C. Visual detection of samples was carried out and pictorial representations were obtained.

Phase separation was also determined using the Turbiscan (Turbiscan MA 2000, Formulaction, Toulouse, France). Each sample (7 mL) was scanned in a Turbiscan tube (65 mm length). The measurement involved scanning each sample along its height for 1 hour at 10 min intervals. The backscattering (BS) and transmission curves generated were used to provide the BS and transmission flux percentage relative to the instrument's internal standard as a function of the height of the sample. Phase separation of the biopolymers was observed and analysed by carrying out multiple scans. Each scan provided a curve and all curves were laid on a single graph. From these scans, stability or separation was observed.

The observations are given in Table 1. According to the Turbiscan analysis, the least (BS=77.1%) and most stable (BS=86.9%) combinations were 15:0.65 and 15:1.95 (BGNS:BGN-SDF), respectively. However, the least stable combination according to visual evaluation is 5:0.65 (BGNS:BGN-SDF) as syneresis and a visible separation of polymer phases were observed.

TABLE 1

Phase separation between BGNS and BGN-SDF

| BGNS:BGN-SDF (g/100 mL) | Visual observation | Initial BS (%) |
|---|---|---|
| 5:0.65 | Visible separation of polymer phases. Syneresis | 78.4 |
| 10:1.3 | A thin layer of SDF observed on the top No syneresis observed Two layers of polymers observed | 79.8 |
| 15:1.95 | No separation observed | 82.9 |
| 15:0.65 | No separation observed | 77.1 |
| 5:1.95 | A thin layer of SDF observed on the top No syneresis observed Two layers of polymers observed | 80.9 |

FIG. 1 shows the Turbiscan profiles of the different BGNS-BGN-SDF combinations. The x-axis denotes the height of the tube and the y-axis denotes the BS flux percentage. The initial BS flux percentage ranged from 78.4% (5 g BGNS:0.65 g BGN-SDF) to 82.9% (15 g BGNS:1.95 g BGN-SDF). Stability is also observed as the extent of separation between the Turbiscan BS scans. The Turbiscan profiles of all combinations follow the same path as the initial scan. However, with the increase in time, a decrease in BS flux percentage is observed resulting in scans that are not perfectly overlaid. The most stable combination exhibits the least separated BS scans.

Therefore, preferably, the graft copolymer nanocomposite has a mass concentration ratio of the polysaccharide containing BGNS to polysaccharide containing BGN-SDF component of about 10 to about 15 g/100 mL of BGNS and about 1.3 to about 1.95 g/100 mL of BGN-SDF, respectively.

Example 2—Synthesis of a Graft Copolymer Nanocomposite

From Example 1, a graft copolymer nanocomposite (hereinafter referred to as the "BGN nanocomposite") with a mass concentration ratio of BGNS and BGN-SDF of 15:1.95 (g/100 mL) was selected for the examples that follow.

Where corresponding results for BGNS and BGN-SDF are shown in the examples that follow, in addition to those for the BGN nanocomposite, those results are shown for illustrative and comparative purposes, and native starch and SDF extracted from BGN should not be construed to fall within the scope of this invention.

In a 100 mL Schott bottle, BGNS (15 g), deionised water (37.5 mL), 16.5% $H_2O_2$ (120 v) and 0.1% of ascorbic acid were mixed then incubated at 90° C. for 45 min in a temperature-controlled water bath. $H_2O_2$ and ascorbic acid together form a redox initiator pair. The mixture was cooled to room temperature before precipitating with 40 mL absolute ethanol dropwise with continuous agitation in a sonicator for 10 min at high speed. The mixture was then centrifuged at 6 000 rpm for 5 min and the supernatant was discarded. The residue was rinsed three times with 40 mL absolute ethanol. 1.95 g BGN-SDF was then added to the obtained BGNS particles and left to react for 24 hours, on a magnetic stirrer in dark conditions. The resulting solution was freeze-dried.

Example 3—Conductivity and Particle Size Determination

Conductivity and particle sizes of the BGN nanocomposite of Example 2 was analysed at a temperature of 25° C. and viscosity of 10 cP using a Zetasizer (Nano ZS90, Malvern Nanoseries Instruments). Samples (0.2 g) were suspended in 5 mL methanol and a polystyrene zeta potential cell (zen1020, Malvern Instruments) was used in the analysis of particle size. A dip cell (zen1002, Malvern Instruments) with a pair of parallel Pd electrodes was used to provide electrical trigger on charged particles. All samples were run 11 times with each run lasting 10 seconds. Data were analysed using the Zetasizer Software.

Table 2 shows the particle size and zeta potential of the BGN nanocomposite.

TABLE 2

Particle size and conductivity of BGN nanocomposite

| | Particle size (nm) | Conductivity (mV) |
|---|---|---|
| BGN nanocomposite | 74.01 | −57.3 |

A negative zeta potential indicates the stability of a compound, with a higher negative value indicating higher stability. The BGN nanocomposite has a high negative zeta potential (−57.3 mV) which is indicative of high stability.

Example 4—Functional Groups

Fourier transform infrared (FTIR) spectra on the BGN nanocomposite of Example 2, as well as BGNS and BGN-SDF, were carried out on a Golden-gate diamond single reflectance ATR in an FTS 7000 FT-IR spectrometer with a DGTS detector as described by Kasran (2013). Finely powdered samples were mixed with dry KBr (1:100, sample: KBr) in a vibratory ball mill capsule for 5 min. The mixture was transferred to a specadie producing an 8.5 mm diameter film which was analysed in the beam of the FTIR spectrophotometer. The spectra were recorded at absorbance mode from 1200 to 800 $cm^{-1}$ at a resolution of 4 $cm^{-1}$ with 128 co-added scans.

Figure 2:
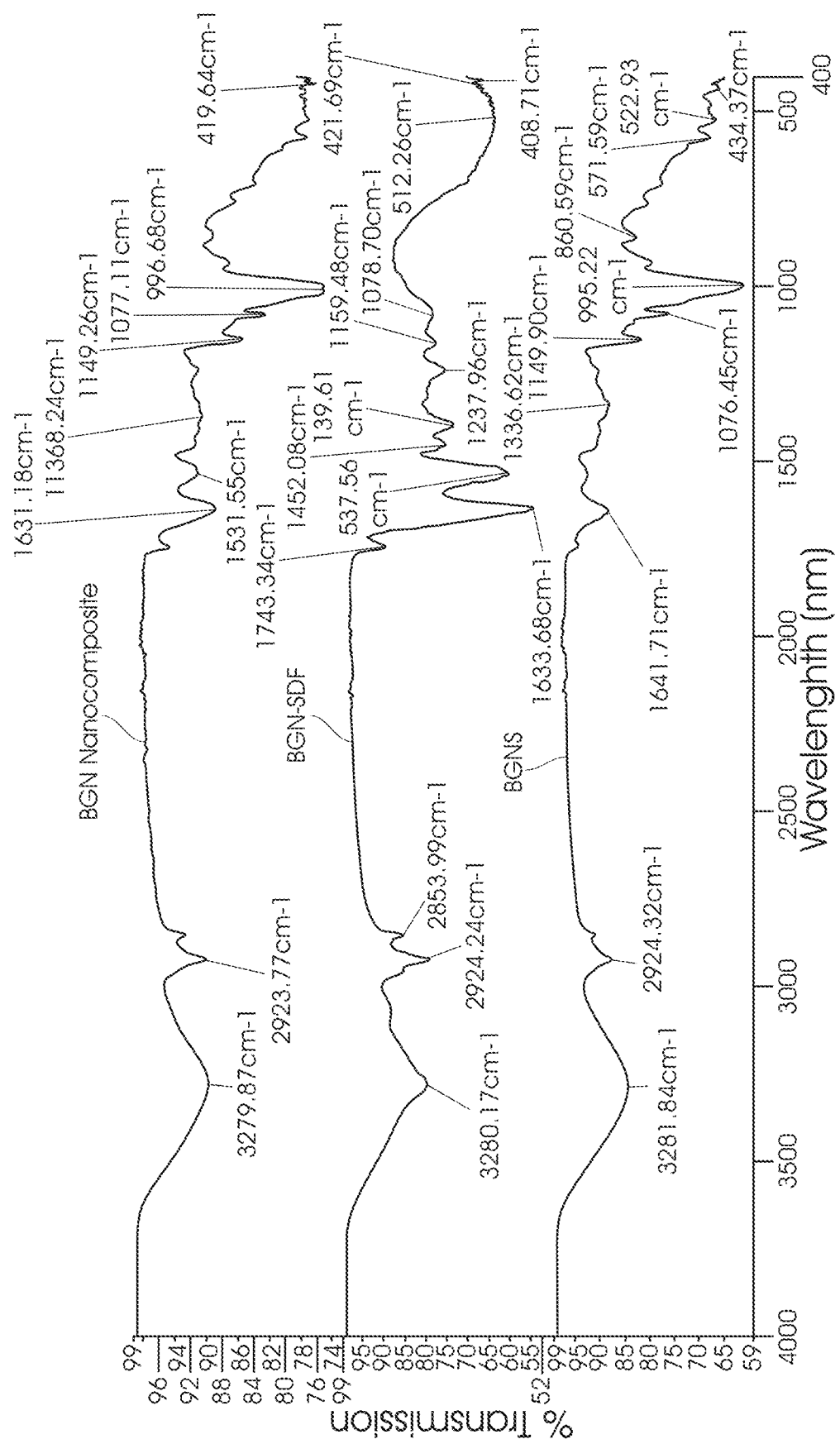
FIG. 2 shows the FTIR spectra of BGNS, BGN-SDF and the BGN nanocomposite.

The IR spectra of the BGN nanocomposite, BGNS and BGN-SDF is shown in FIG. 2. Although FIG. 2 provides clear evidence that the BGN nanocomposite is a new composite formed from BGNS and BGN-SDF, all three biopolymers appear to have a similar composition, which explains the resemblance in their IR spectra. The IR spectra of BGNS shows a characteristic band with a peak at 2924.32 $cm^{-1}$ in the region of 2800-3000 $cm^{-1}$, that is attributed to the stretching of C—H bonds. Broadband in the region 3600-3000 $cm^{-1}$ could be attributed to the vibrational stretching of the hydrogen-bonded OH groups. These are associated with the inter- and intra-molecular bound OH groups having a polymeric association, which makes up the gross structure of starch.

The peaks in the region 3380-1400 cm$^{-1}$ are characteristic of stretching vibrations and deformation of the OH bond of water, while the peak at 1641.71 cm$^{-1}$ is characteristic of C═O of carboxyl groups as well as the vibration of OH of water molecules in the non-crystalline region of starch. The absorbance in the region 1200-900 cm$^{-1}$ is characteristic of polysaccharides and is indicative of the vibration of C—O, C—C and C—H—O bonds. Absorbance at 861-400 cm$^{-1}$ is indicative of the presence of sugars. This further confirms the presence of C, H and O atoms which make up the skeleton of starch molecules. The bands between 1300 and 800 cm$^{-1}$ represent the vibration of C—O and C—C bonds. The peaks at 860.59, 571.59 and 522.93 cm$^{-1}$ were only detected in BGNS.

The IR spectra for BGN-SDF has similar peaks to BGNS spectra at 3280.17, 2924.24 and 1633.68 cm$^{-1}$, as can be seen in Table 3. The bands at 1633.68 and 1537.56 cm$^{-1}$ is attributed to the deformation of groups of primary amide NH indicating the presence of protein. The sharp peak at 2853.99 cm$^{-1}$ is more pronounced in BGN-SDF than in BGNS. While not being bound to any particular theory, this may be because starch is only composed of glucose molecules while BGN-SDF has glucose, arabinose, galactose, fucose, fructose, mannose and xylose. The peaks at 1743.34, 1537.56, 1452.68 and 1237.96 cm$^{-1}$ are present in BGN-SDF but absent in BGNS. The peak at 1237.96 cm$^{-1}$ is representative of the C—O stretch of CH$_2$OH. A pronounced peak at 1393.61 cm$^{-1}$ is observed and is characteristic of CH$_3$ vibration. This peak is absent in both BGNS and the BGN nanocomposite.

The indicative presence of amides and esters in BGN-SDF confirms the complex nature of the dietary fibre.

The IR spectra of the BGN nanocomposite resembles that of BGNS and BGN-SDF (FIG. 2). FTIR spectra of the BGN nanocomposite shows polysaccharide typical bands at 2923.77, 3279.87 and 1631.18 cm$^{-1}$. The wavenumber 1077.11 cm$^{-1}$ shows sharp peaks in BGNS (1076.45 cm$^{-1}$) and BGN-SDF (1078.70 cm$^{-1}$) but is not sharp in the BGN nanocomposite, signifying a change in the structure of the new composite. BGNS and the BGN nanocomposite have peaks in the region 434.37-571.59 cm$^{-1}$ while no peaks are detected in the BGN-SDF. The disappearance of these spectral bands in the BGN nanocomposite indicates that BGNS and BGN-SDF were successfully conjugated resulting in the disruption of C—H bonds as new bonds were formed. Of particular interest is the peak at 1531.55 cm$^{-1}$ which is also observed on the IR spectrum of BGN-SDF (1537.56 cm$^{-1}$) but is absent in BGNS.

The peak is due to the deformation of the NH of the primary amide group. The absence in BGNS is indicative of a significantly (p≤0.05) low protein concentration in the starch. A peak is observed at 996.68 cm$^{-1}$ which corresponded with the peak in BGNS spectrum (995.22 cm$^{-1}$) but is absent in BGN-SDF. These observations indicate that the BGN nanocomposite possesses similar functional groups of both BGNS and BGN-SDF. A slight shift in peaks is observed for the BGN nanocomposite and this further indicates the successful formation of a new composite.

TABLE 3

FTIR spectra of BGNS, BGN-SDF and the BGN nanocomposite

| Polysaccharide | Wavelength cm$^{-1}$ |
|---|---|
| BGNS | 3281.84, 2924.32, 1641.71, 1336.92, 1149.90, 1076.45, 995.22, 860.59, 571.59, 522.93, 434.37 |
| BGN-SDF | 3280.17, 2924.24, 2853.99, 1743.34, 1633.68, 1537.56, 1452.68, 1393.61, 1237.96, 1159.48, 1078.70, 512.26, 421.69, 408.71 |
| BGN nanocomposite | 3279.87, 2923.77, 1631.18, 1531.55, 1368.24, 1149.26, 1077.11, 996.68, 419.64 |

Example 5—Crystallinity

Powder X-ray diffraction patterns were collected in transmission using an X-ray diffractometer. All samples were measured in the 2θ angle range between 5° and 70° at a step size of 0.034, target voltage of 40 kV, target current of 100 mA, the ageing time of 5 min and radiation wavelength of 0.1542 nm. Powder XRD was used to determine the structure of the BGN nanocomposite.

Figure 3:
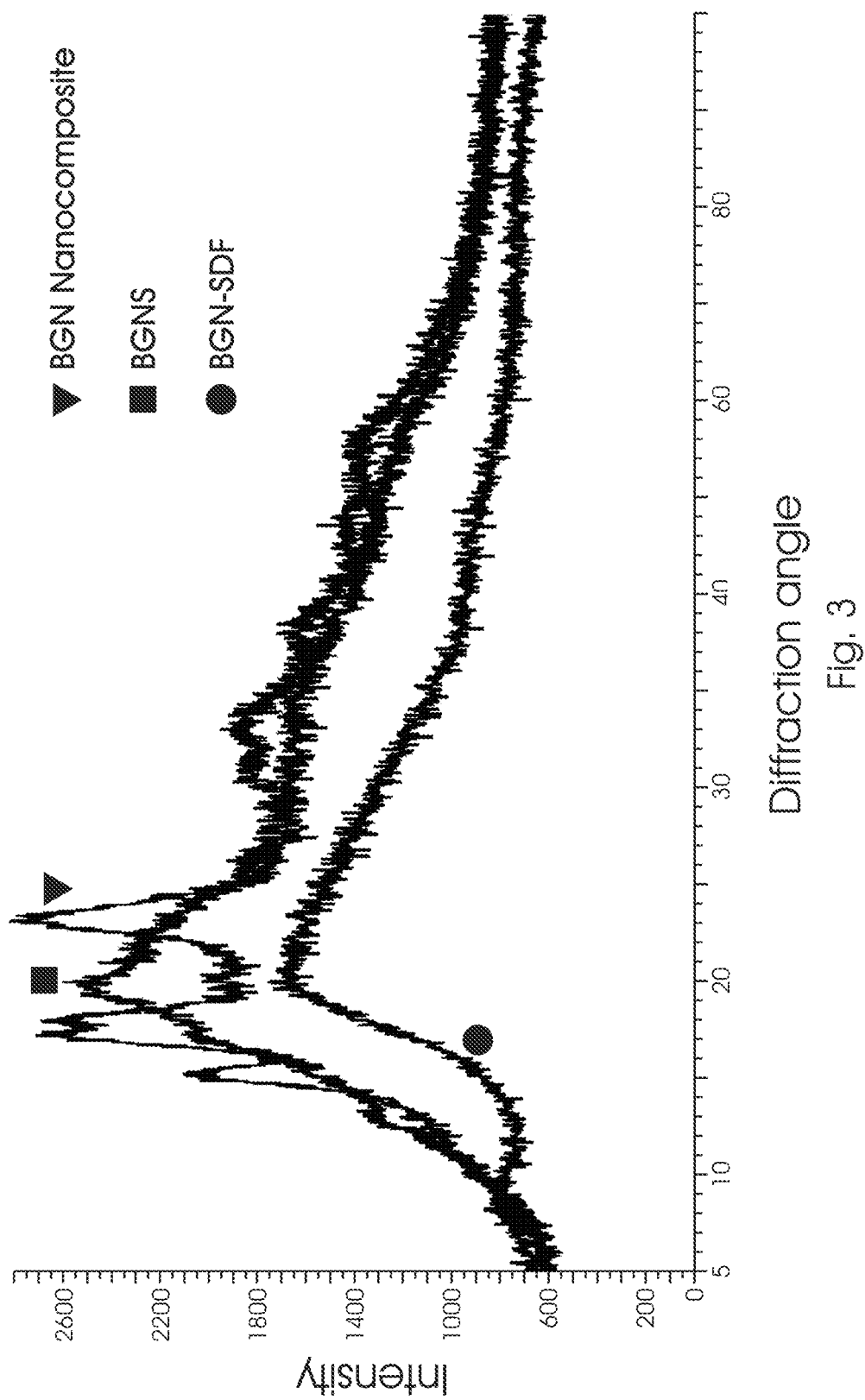
FIG. 3 shows the powder X-ray diffraction (XRD) patterns of the BGN nanocomposite, BGNS and BGN-SDF, indicating crystallinity.

The crystalline patterns of the BGN nanocomposite, BGNS and BGN-SDF are represented in FIG. 3. BGNS exhibited strong peaks at 15, 17 and 23° (2θ) which is typical of C-type diffraction pattern. Type C crystallinity is typical in legumes and is therefore appropriate for BGNS. Type C starch is characterised by lower digestibility compared to type A starches, typical of cereals. This in turn indicates a low glycemic index (GI) thereby making BGNS suitable for diabetics and desirable for weight-conscious consumers. The BGN nanocomposite and BGN-SDF did not exhibit any crystallinity and are amorphous. Following chemical treatment, BGNS loses crystallinity and becomes amorphous, thereby increasing the solubility in water. This indicates that the BGN nanocomposite formed will be highly soluble in water and, as such, can find use as a thickener, stabiliser and in other food formulations that require dispersion of water.

Example 6—Morphology and Microstructure

To investigate the morphology and microstructure of the biopolymers, a scanning electron microscope was used. A freeze-dried thin layer of the sample was mounted on aluminium stubs with double-sided carbon tape then coated with a thin layer of gold to make it electrically conducting. Two fields per sample were studied to obtain a representative number of particles (n=300-800 particles). The samples were examined at 7 kV.

Figure 4:
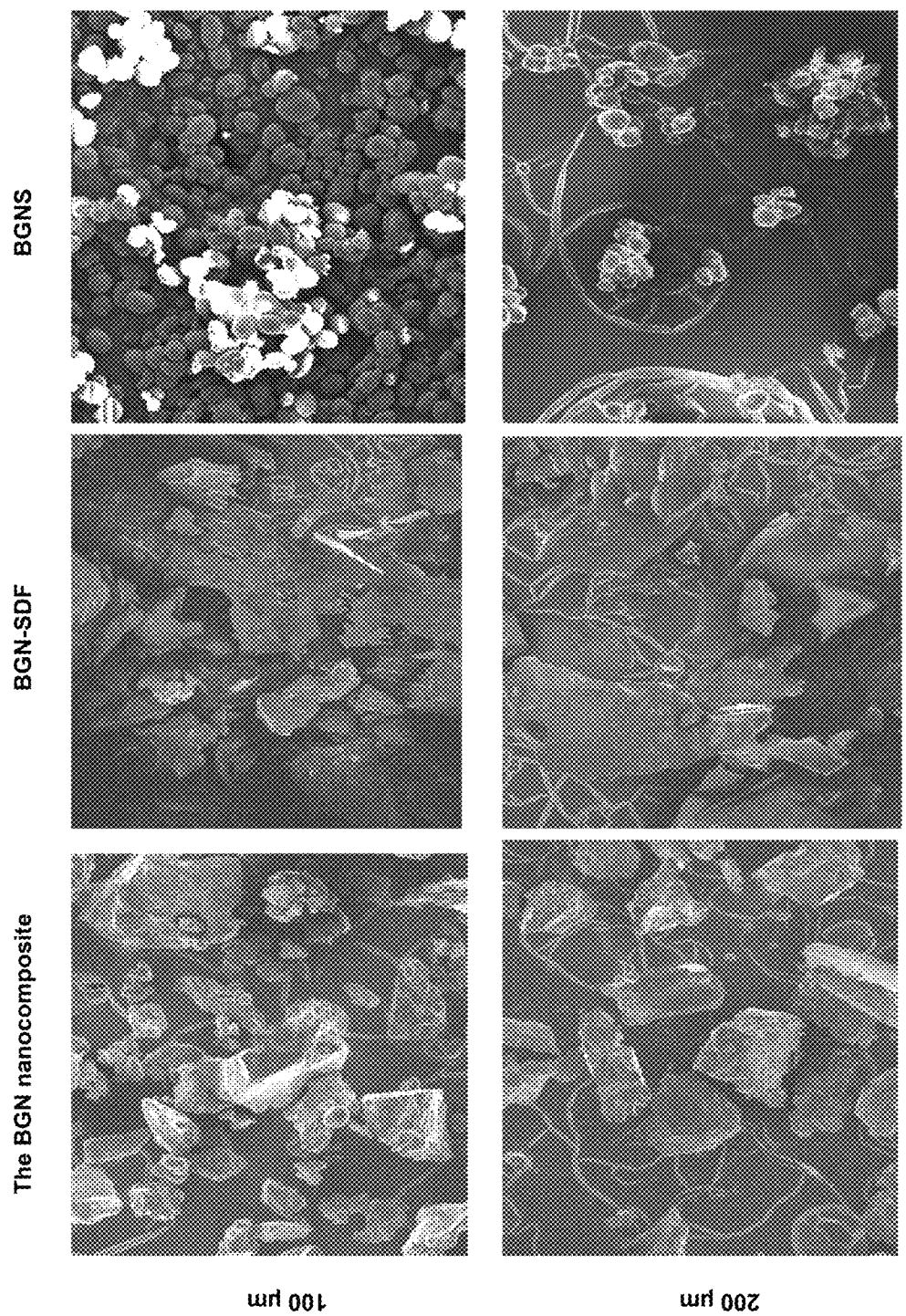
FIG. 4 shows scanning electron micrographs of BGNS, BGN-SDF and the BGN nanocomposite at a resolution of 100-200 μm.

Scanning electron micrographs of BGNS, BGN-SDF and the BGN nanocomposite at a resolution of 100-200 μm are shown in FIG. 4. BGNS granules exhibit a spherical structure with a smooth, unfractured surface typical of BGN starches, indicating a significant purity of the extracted particles. BGN-SDF and the BGN nanocomposite exhibit irregular and polygonal forms. These results correspond with the XRD patterns observed in FIG. 3. The microstructure of the BGN nanocomposite, as shown in FIG. 4, clearly indicates the successful formation of a new composite from BGNS and BGN-SDF.

Example 7—Fluorescence Analysis

A 10 mg sample of BGNS, BGN-SDF and the BGN nanocomposite was dissolved in 50 mL deionised water then transferred to a cuvette (1 cm path length) and the fluorescence was measured using a spectrofluorimeter following the method of Singh et al. (2010). The settings used were: Excitation and emission slit -2.5 nm; Acquisition interval—1 nm: Integration time for the total luminescence spectra—0.1 s; Integration time for the synchronous scan method—0.05 s. The excitation-emission matrices spectra were recorded from 250 to 500 nm at 5 nm intervals, while the emission spectra ranged between 280 to 600 nm at 5 nm intervals. Excitation and emission monochromator in the range of 250-500 nm were run concurrently to obtain a synchronous fluorescence spectrum.

Figure 5:
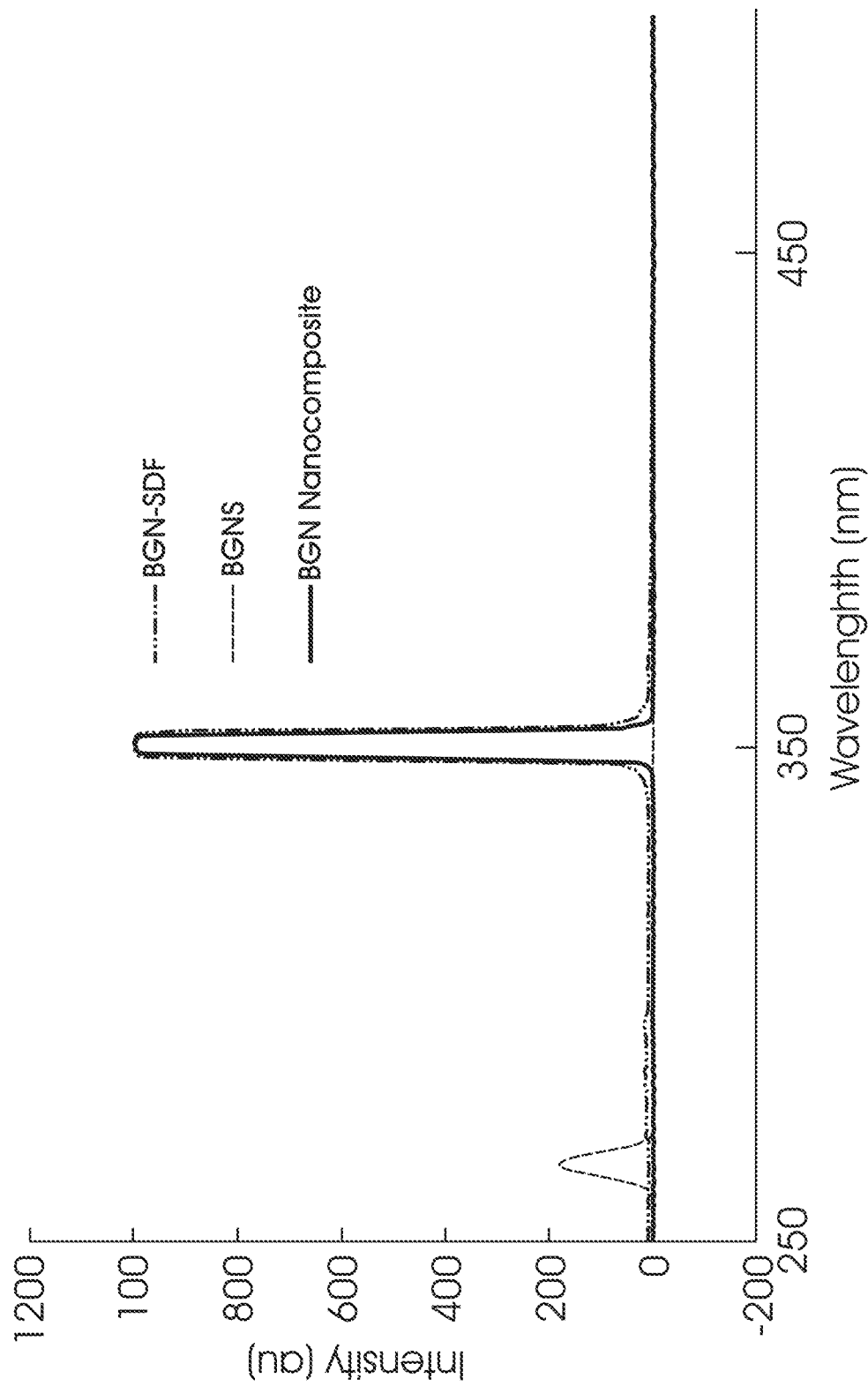
FIG. 5 shows the fluorescence spectra of BGNS, BGN-SDF and the BGN nanocomposite.

The fluorescence spectra of BGNS, BGN-SDF and the BGN nanocomposite are shown in FIG. 5. BGNS has an emission spectrum at 255 nm while BGN-SDF and the BGN nanocomposite has emission spectra at 350 nm. The chemical complexing of BGN-SDF and BGNS causes a change in the intra- and inter-molecular bonds of BGNS, which is confirmed by the shift in the emission wavelength, from 255 nm (BGNS) to 350 nm (the BGN nanocomposite). The shift in the emission peaks correlates with the formation of new functional groups as seen in the FTIR spectra (FIG. 2). The fluorescence emission at 350 nm for the BGN nanocomposite is indicative of the presence of phenolic compounds.

Example 8—Thermal Properties

Figure 6:
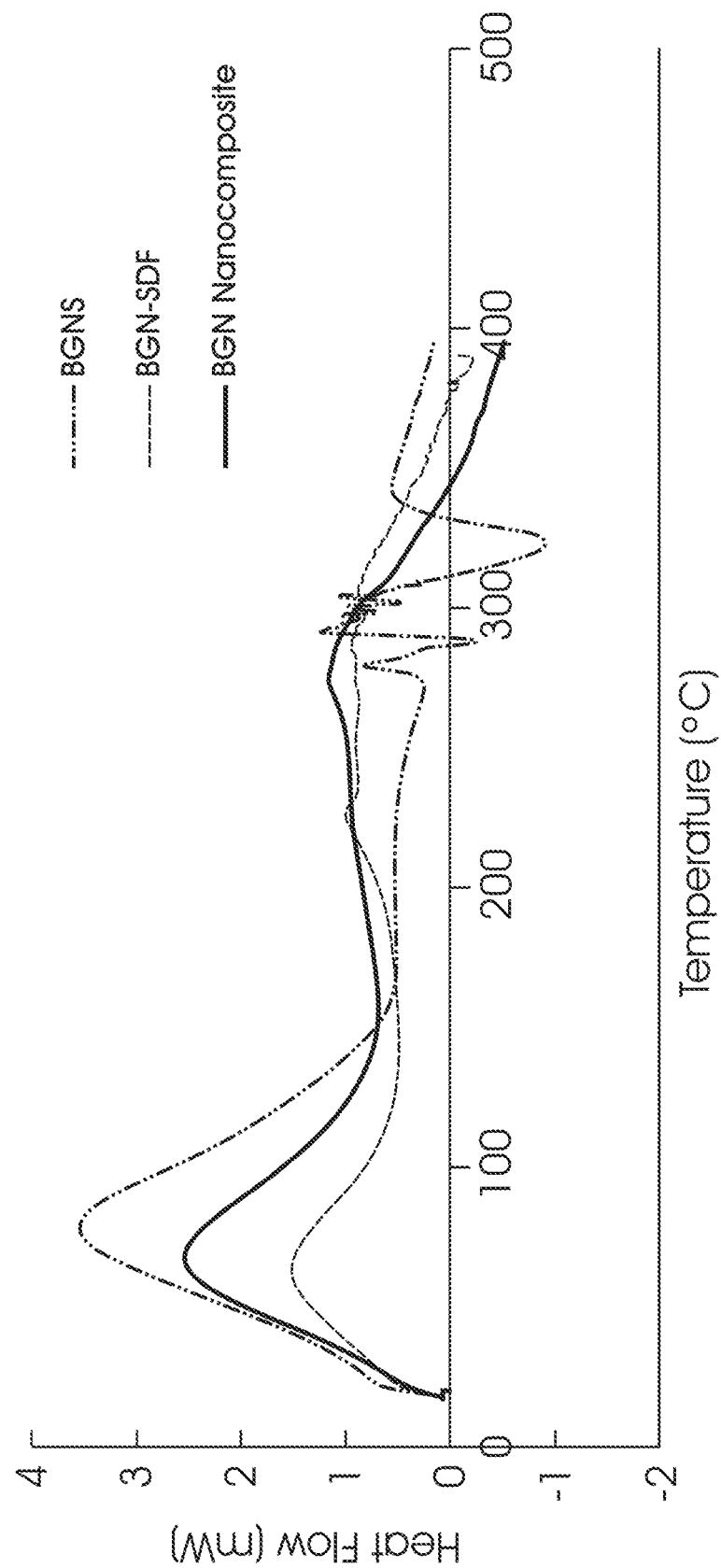
FIG. 6 shows the thermal properties of BGNS, BGN-SDF and the BGN nanocomposite using differential scanning calorimetry (DSC).

The thermal properties of BGNS, BGN-SDF and the BGN nanocomposite were determined using DSC and the thermograms are illustrated in FIG. 6. Three major peaks were observed for BGNS at 77.19, 279.52 and 322.86° C. and the area of each peak was 1420.91, 18.10 and -183 mJ, respectively. Two major peaks are observed for BGN-SDF at 68.84 and 230.30° C. and the area of each peak is 397.79 and 18.70 mJ, respectively. Two major peaks are observed for the BGN nanocomposite at 65.50 and 293.14° C. and the area of each peak is 875.01 and 83.98 mJ, respectively.

Figure 7:
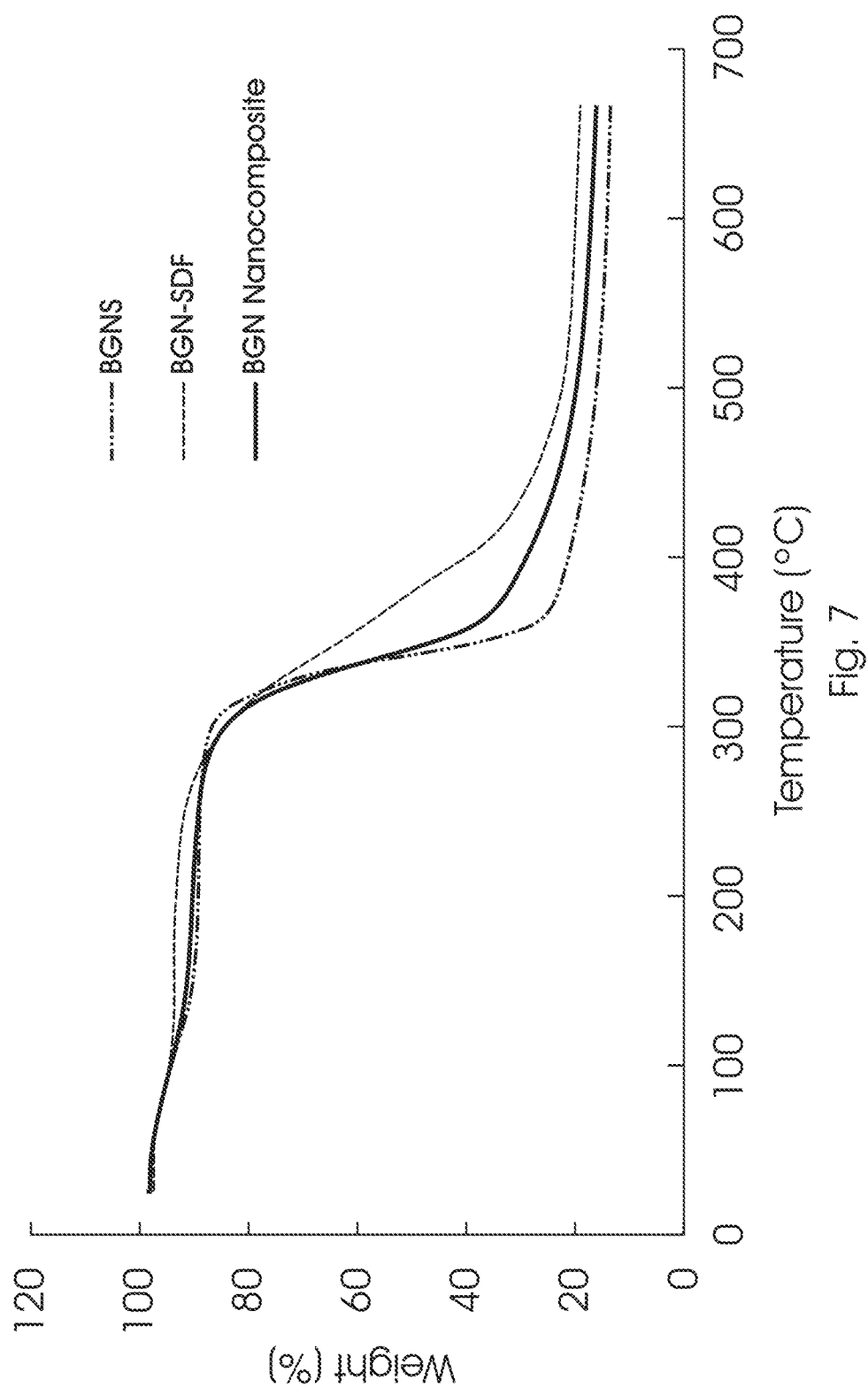
FIG. 7 shows the thermal properties of BGNS, BGN-SDF and the BGN nanocomposite using thermogravimetric analysis (TGA).

The initial peak thermal transition of the three biopolymers ranges from 65.50 to 77.19° C. and is attributed to the loss of moisture and volatile compounds, which is a typical endothermic process. The first peak of BGNS is at 77.19° C. and represents the gelatinisation of the starch. The changes in enthalpy (ΔH) of the first peaks of the biopolymers correspond with the moisture contents of the biopolymers (FIG. 7). As observed, less energy is required in dispelling moisture from the BGN nanocomposite, thus it can be assumed that it has the smallest moisture content.

The maximum degradation of the biopolymers occurs at 279.52, 230.30 and 293.14° C. for BGNS, BGN-SDF and the BGN nanocomposite, respectively. The BGN nanocomposite has the highest enthalpy change of reaction (25.09 J/g) while BGNS has the lowest (5.84 J/g). This indicates that the BGN nanocomposite has relatively higher thermal stability, which confirms the introduction of strong intra- and inter-molecular bonds during the formation of the nanocomposite. BGNS requires the least amount of energy for the disintegration of bonds because it is comparatively simpler in structure. BGN-SDF, on the other hand, is composed of chemically complex polysaccharides. The BGN nanocomposite was produced from the conjugation of BGNS and BGN-SDF, introducing new functional groups during the chemical grafting process. This is in agreement with the FTIR results (FIG. 2).

The degradation of the BGN nanocomposite peaked at 239° C. The BGN nanocomposite will therefore withstand relatively high thermal processing, such as baking, which has temperatures typically varying between 176° C. and 250° C.

A pronounced peak at 322.86° C. is observed on the BGNS thermogram representing the final decomposition of starches. The exothermic behaviour shows that BGNS is charred instead of volatilised at the final degradation stage meaning the molecules released energy as they combusted. This was confirmed by examining the DSC pans post-analysis revealing charred samples.

The TGA thermographs of BGNS, BGN-SDF and the BGN nanocomposite are illustrated in FIG. 7. The initial weight loss and weight loss temperature for BGNS, BGN-SDF and the BGN nanocomposite was 11.84% at 319.82° C., 11.30% at 295.37° C. and 11.25% at 311.66° C., respectively.

At temperatures below 100° C., weight loss occurred due to the evaporation of water and loss of volatile matter compounds. This is in agreement with the mass lost due to evaporation observed in DSC studies (FIG. 6). This corresponds with the particle sizes of the biopolymers (Table 2) where the BGN nanocomposite and BGNS had the smallest and highest average particle sizes, respectively.

Therefore, the BGN nanocomposite has the largest surface area, hence more heat is absorbed by the water molecules leading to increased kinetic energy and subsequently translated to a faster rate of evaporation. The remaining mass at the end of TG analysis was concluded to be ash. The amount of ash remaining was the BGN nanocomposite>BGN-SDF>BGNS.

REFERENCES

Adeyi, O., Ikhu-Omoregbe, D., & Jideani, V. (2014). Emulsion stability and steady shear characteristics of concentrated oil-in-water emulsion stabilized by gelatinized Bambara groundnut flour. *Asian Journal of Chemistry*, 26, 4995-5002. https://doi.org/10.14233/ajchem.2014.16287

Afolabi, T. A. (2012). Synthesis and physicochemical properties of carboxymethylated bambara groundnut (*Voandzeia subterranea*) starch. *International Journal of Food Science and Technology*, 47, 445-451. https://doi.org/10.1111/j.1365-2621.2011.02860.x Kasran, M. (2013). Development of Protein Polysaccharide Complex for Stabilization of Oil-in-Water Emulsions. PhD Thesis, The University of Guelph. http://hdl.handle.net/10214/5445

Maphosa, Y., & Jideani, V. A. (2016). Physicochemical characteristics of Bambara groundnut dietary fibres extracted using wet milling. *South African Journal of Science*, 112, 1-8. http://dx.doi.org/10.17159/sajs.2016/20150126

Singh, S., D'Sa, E., & Swenson, E. (2010). Seasonal variability in CDOM absorption and fluorescence properties in the Barataria Basin, La., USA. *Journal of Environmental Sciences*, 22, 1481-1490. https://doi.org/10.1016/s1001-0742(09)60279-5

What is claimed is:

1. A graft copolymer nanocomposite comprising:
   a polysaccharide containing starch component derived from *Vigna subterranea*; and
   a polysaccharide containing soluble dietary fibre component derived from *Vigna subterranea*,
   wherein the nanocomposite comprises one or more copolymers of the soluble dietary fibre polysaccharide component grafted onto a matrix of the starch polysaccharide component.

2. The nanocomposite according to claim 1, which has an FTIR spectra as shown in FIG. 2.

3. The nanocomposite according to claim 1, which has peaks on an FTIR spectrum at about 3279.87, 1631.18, 1077.11, and 419.64 cm$^{-1}$.

4. The nanocomposite according to claim 1, which has peaks on an FTIR spectrum at about 3279.87, 2923.77, 1631.18, 1531.55, 1368.24, 1149.26, 1077.11, 996.68, and 419.64 cm$^{-1}$.

5. The nanocomposite according to claim 1, which has a mass concentration ratio of polysaccharide containing starch component to polysaccharide containing soluble dietary fibre component of about 10 to about 15 g/100 mL of polysaccharide containing starch component and about 1.3 to about 1.95 g/100 mL of polysaccharide containing soluble dietary fibre component, respectively.

6. The nanocomposite according to claim 5, which has a mass concentration ratio of polysaccharide containing starch component to polysaccharide containing soluble dietary fibre component of about 15:1.95 (g/100 mL).

7. The nanocomposite according to claim 1, which has an average particle size of about 74.01 nm.

8. The nanocomposite according to claim 1, wherein the soluble dietary fibre polysaccharide component is grafted onto the matrix chemically, using ascorbic acid and hydrogen peroxide as a redox initiator pair.

9. The nanocomposite according to claim 8, wherein the redox initiator pair has a weight ratio of about 1% w/w ascorbic acid to about 165% w/w hydrogen peroxide.

\* \* \* \* \*